US012029171B2

(12) United States Patent
Hiers

(10) Patent No.: US 12,029,171 B2
(45) Date of Patent: Jul. 9, 2024

(54) TREE LIMB HOOK CONNECTOR AND METHOD OF USE

(71) Applicant: Michael Hiers, Tallahassee, FL (US)

(72) Inventor: Michael Hiers, Tallahassee, FL (US)

(*) Notice: Subject to any disclaimer, the term of this patent is extended or adjusted under 35 U.S.C. 154(b) by 0 days.

(21) Appl. No.: 17/096,185

(22) Filed: Nov. 12, 2020

(65) Prior Publication Data
US 2021/0137029 A1 May 13, 2021

Related U.S. Application Data

(60) Provisional application No. 62/934,050, filed on Nov. 12, 2019.

(51) Int. Cl.
A01G 17/10 (2006.01)

(52) U.S. Cl.
CPC ................... A01G 17/10 (2013.01)

(58) Field of Classification Search
CPC ...................................... A01G 17/10
USPC .............................................. 47/42
See application file for complete search history.

(56) References Cited

U.S. PATENT DOCUMENTS

| | | | | |
|---|---|---|---|---|
| 477,939 A * | 6/1892 | Hubbel | ................... | A01G 17/10 24/129 C |
| 992,514 A * | 5/1911 | Messler | ................... | A01G 17/10 47/42 |
| 1,051,208 A * | 1/1913 | Fletcher | ................. | A01G 17/10 47/42 |
| 1,389,932 A * | 9/1921 | Bosmajian | ............. | A01G 17/10 47/42 |
| 3,040,477 A * | 6/1962 | June | ........................ | A01G 17/12 47/42 |
| 3,245,239 A * | 4/1966 | Zaidener | ............. | B60R 25/0221 70/237 |
| 4,935,047 A * | 6/1990 | Wu | ...................... | B60R 25/0225 70/238 |
| 5,099,664 A * | 3/1992 | Wen-Yin | ............. | B60R 25/0225 70/226 |
| 5,131,245 A * | 7/1992 | Chen | .................... | B60R 25/0225 70/226 |
| 5,277,042 A * | 1/1994 | Tobias | ................ | B60R 25/0225 70/226 |
| 7,152,367 B2 * | 12/2006 | Mastronardi | .......... | A01G 17/10 24/345 |

FOREIGN PATENT DOCUMENTS

| | | | | |
|---|---|---|---|---|
| KR | 200472367 Y1 * | 4/2014 | ............. | A01G 17/10 |
| KR | 20180017875 A * | 2/2018 | | |
| KR | 200472367 Y1 * | 3/2019 | ............. | A01G 9/143 |

* cited by examiner

Primary Examiner — Monica L Perry
Assistant Examiner — Brittany A Lowery
(74) Attorney, Agent, or Firm — Adrienne Love

(57) ABSTRACT

A tree limb connector and method of use has a first member and second member that, when connected, securely hold two limbs of a tree in place. The device has a first member with a hook at a first end and a hollow receptacle at a second end. A second member has a hook at a first end and a threading on a second end with a length and teeth. Each hook attaches onto one limb of a tree. The threading is pulled into a first end of receptable and out of a second end of the receptacle, held securely in place via a tongue at the second end of the receptacle that catches a rib at a desired length. The present invention and methods may be used to bring two plant limbs closer together to reduce bare spots for ornamental reasons, such as on a Christmas tree, or provide added support.

5 Claims, 14 Drawing Sheets

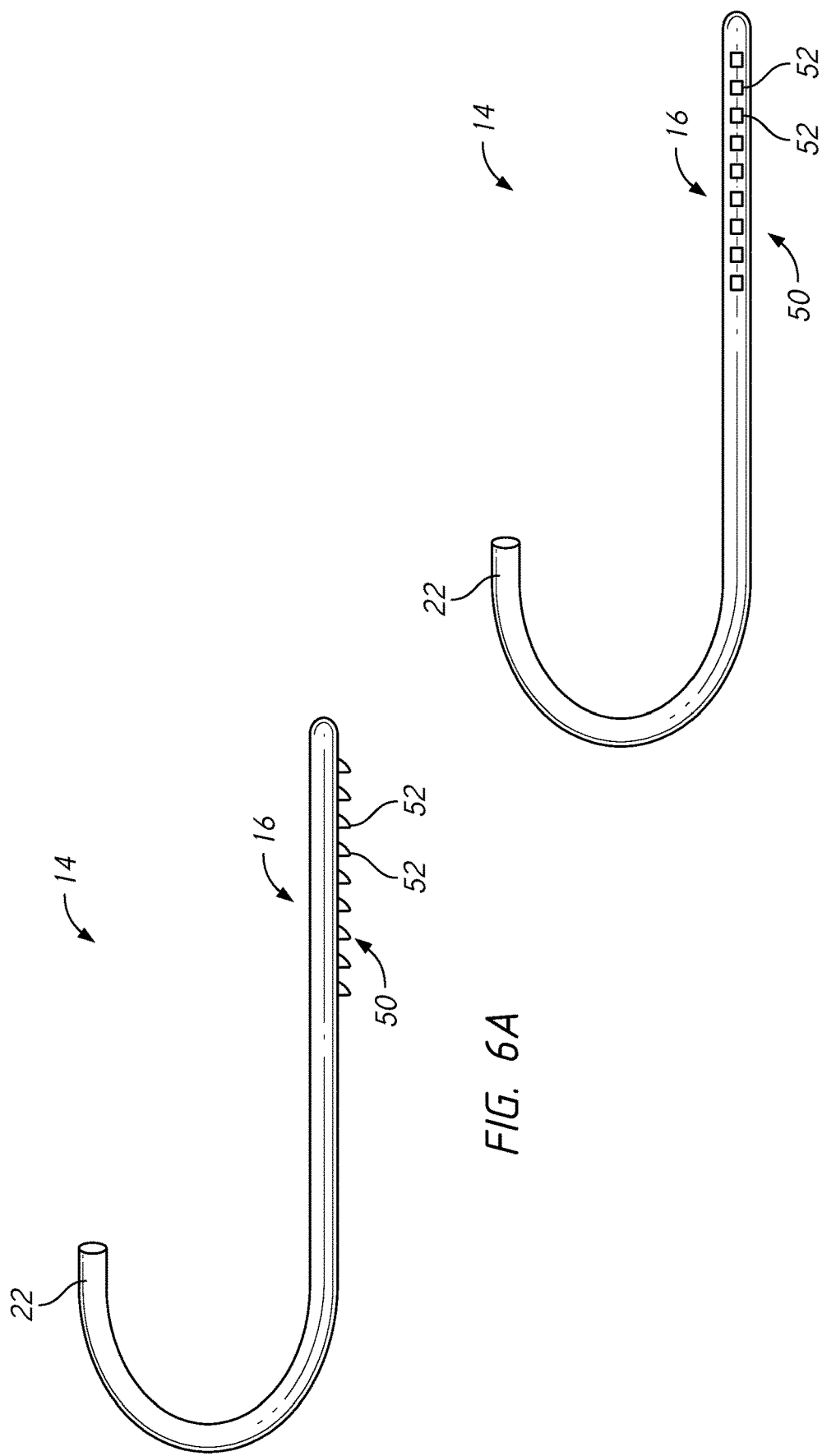

TREE LIMB HOOK CONNECTOR AND METHOD OF USE

CROSS-REFERENCES TO RELATED APPLICATIONS

Pursuant to the provisions of 37 C.F.R. § 1.53(c), this non-provisional application claims the benefit of an earlier-filed provisional patent application. The earlier application was assigned U.S. Ser. No. 62/934,050. It lists the same inventor.

STATEMENT REGARDING FEDERALLY SPONSORED RESEARCH OR DEVELOPMENT

Not applicable.

MICROFICHE APPENDIX

Not applicable.

BACKGROUND

1. Field of the Invention

This invention relates to the field of devices made for connecting and supporting tree limbs. Specifically, the invention relates to a mechanism and method for connecting two limbs of a tree, shrub, or other plant together to create the illusion of a fuller, less bare plant.

2. Description of the Related Art

The need to reduce bare spots in trees or plants often occurs in decorative landscaping and ornamental Christmas trees in which a uniform, full appearance in the limbs of the plant is important for decorative purposes. Currently, when one has purchased a plant with a bare spot, the solution is usually to turn the plant such that the most even, fullest part of the plant faces the viewer. For example, if a person purchases a Christmas tree, it is usually wrapped up in netting for travel. Once the tree is released from the netting, placed in its tree stand, and the limbs begin to fall into place, one or more bare spots appear. The solution is typically to pivot the tree such that the barest spots are in the back (typically up against a wall) so that viewers see the fullest part of the tree. Such a solution does not actually create a more full-looking tree and is not feasible in situations where the plant or tree is not backed up against a wall, such as in landscaping.

Another solution could be to use a fastener to tie a separate branch or limb to the bare spot. A prior art fastener (here, a zip tie) attached to a portion of a Christmas tree is shown in FIG. 1. A user has found a loose limb 40 that was not attached to Christmas tree 32. Then, the user attached limb 40 to Christmas tree 32 by tightening fastener 28 around trunk 36 and limb 40 to fill in a previously bare spot. However, this solution requires the user to obtain a completely separate branch from the tree or plant or chop the branch from a different part of the tree or plant. It also requires the user to attach a large fastener around the entire trunk of a tree, which can be extremely cumbersome and impractical, especially without the help of another user. Additionally, this solution is short term and does not typically hold a branch to a tree for long periods of time, since gravity is working against the weight of the branch and there is no real support for the branch attachment other than the tightening of the fastener. Additionally, the branch will die faster than the tree itself when no longer a part of the tree. If the fastener is tied too tight, depending on the tree it is used with, it can also cause irreparable damage and even possible loss of life to the tree or plant due to strangulation and bark harm.

FIGS. 2-4 provide examples of different trees that would benefit from the present invention. FIG. 2 shows a typical Christmas tree 32 with its trunk 36 secured in stand 34. As can be seen, Christmas tree 32 has bare spot 30. Because Christmas tree 32 is typically brought inside and secured in stand 34 solely for ornamental and decorative purposes, it is especially important that Christmas tree 32 has very little, if any, bare spots and presents a full, lush appearance. Christmas tree 32 is also meant to hold ornaments, and thus is it doubly important that the drooping limb creating bare spot 30 is secured such that it can hold ornaments to lessen the risk of an ornament falling off of the drooping limb and breaking. FIG. 3 shows a typical tree 38. Trunk 36 breaks off into various branches. As can be seen, limb 40 is leaning away from the other limbs in the tree, creating bare spot 30. As time passes, limb 40 may begin to sag or grow close to the ground. This is typical where the tree has fruit, pine cones, acorns, etc. that weigh down the limb. It is in this type of tree in which the present invention may be used not only for ornamental purposes, but also to support limb 40 utilizing the present device and other branches. FIG. 4 shows a plant 42. Stem 44 has grown away from the other stems present on plant 42, thus creating bare spot 30. It is in this figure that the reader will appreciate that the present invention, as shown and described below, is capable of repairing bare spots in plants by attaching horizontally to limbs or stems, as opposed to merely vertically.

The drooping of a stem or branch or a bare spot, as shown in FIGS. 3-5 is commonly found in trees or plants. These irregularities may be caused by the natural growth of the plant, a storm, a pressure, force or weight, or through the maneuvering of the plant to a different location once it has been cut down. Thus, bare spot 30 may appear in many plants, and the reader will appreciate that the present invention may be used with many more types of plants than the examples shown in FIGS. 2-4.

For the foregoing reasons, there is a need for an easier, quicker, and longer lasting way to simultaneously provide a fuller look to bare spots on a plant or tree while also providing added support. The present invention solves these problems by providing a device and methods of use to easily close the gaps formed in uneven trees or plants and provide more even weight distribution throughout the tree or plant.

BRIEF SUMMARY

The present invention is directed to a device and method to connect two limbs of a plant together and hold them securely in place. The device comprises two separate and distinct pieces (a first member and a second member) that become one unit while in use. The first member has a hook on one end and a receptacle on the opposite end, which is a hollow housing with openings on two sides. The second member has a hook on one end and a flat strip on the opposite end with threading having teeth at the end of the flat strip. As such, the flat strip enters through aperture formed by receptacle on first member and goes through the receptacle and out of the rear of aperture of the receptacle. The positive-locking teeth on threading catch on the tongue attached to the aperture of the receptacle, securely attaching the first and second member together. The teeth are positive-locking such that they may only be pushed in one way and cannot be pulled out again. Thus, a user is able to thread the first member through the second member until reaching a desired length, at which point the two members remain securely engaged with each other. The two members of the present device engage with each other much like a common zip tie fastener.

The method of use in the present invention starts with placing first hook of the present device around the limb or stem of a tree, bush, shrub etc. The second hook is placed around a second limb or step. Next, the user will force the strip of second member and the receptacle end of first member towards one another. This process forces the two limbs or steps together, closing the bare spot or supporting the low hanging limb. Once the receptacle and strip are close together, the user will insert the strip into the opening of the receptacle, pulling the strip through the receptacle until it exits the other end receptacle. The user will continue to do this until the desired distance between the limbs has been reached. The interaction between tongue and teeth securely connects first member to second member of present device, thereby holding the two limbs securely in the desired position.

The present device and method of use provides many advantages over the prior art. Commonly, decorative shrubs, bushes, and trees (including Christmas trees), have bare spaces, providing an undesirable and non-uniform look. Thus, it is necessary to fill in said bare spaces discreetly to create the illusion that the plant is perfectly uniform, especially for ornamental landscaping and decorative Christmas trees. The present device and method of use forces the limbs of the plants together to lessen or eliminate bare spots in a discreet manner. The present device and method of use may also be used to support low hanging limbs.

These and other features, aspects, and advantages of the present invention will become better understood with reference to the following description, appended claims, and accompanying drawings.

BRIEF DESCRIPTION OF THE DRAWINGS

FIG. 6A is a perspective view, showing another component part of the present device.

FIG. 6B is a perspective view, showing another component part of the present device.

Figure 1:
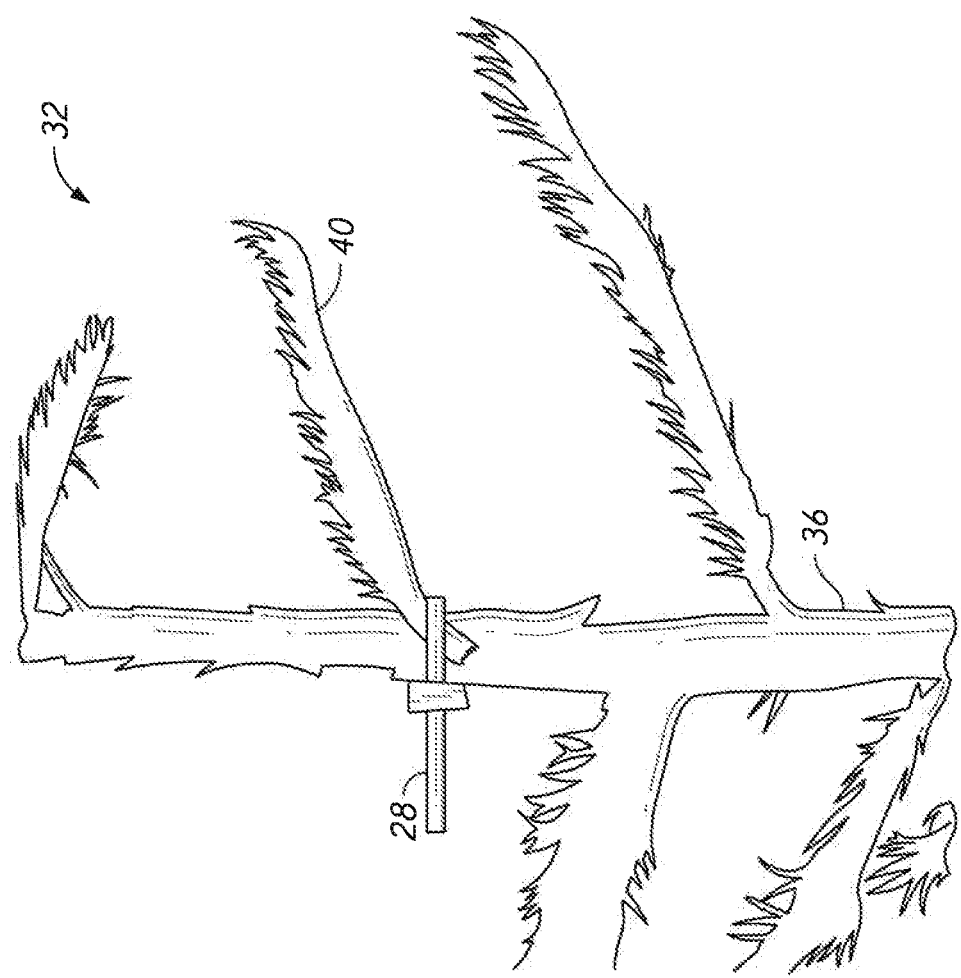
FIG. 1 is an exploded view, showing a prior art fastener holding a tree branch to a tree.
Figure 2:
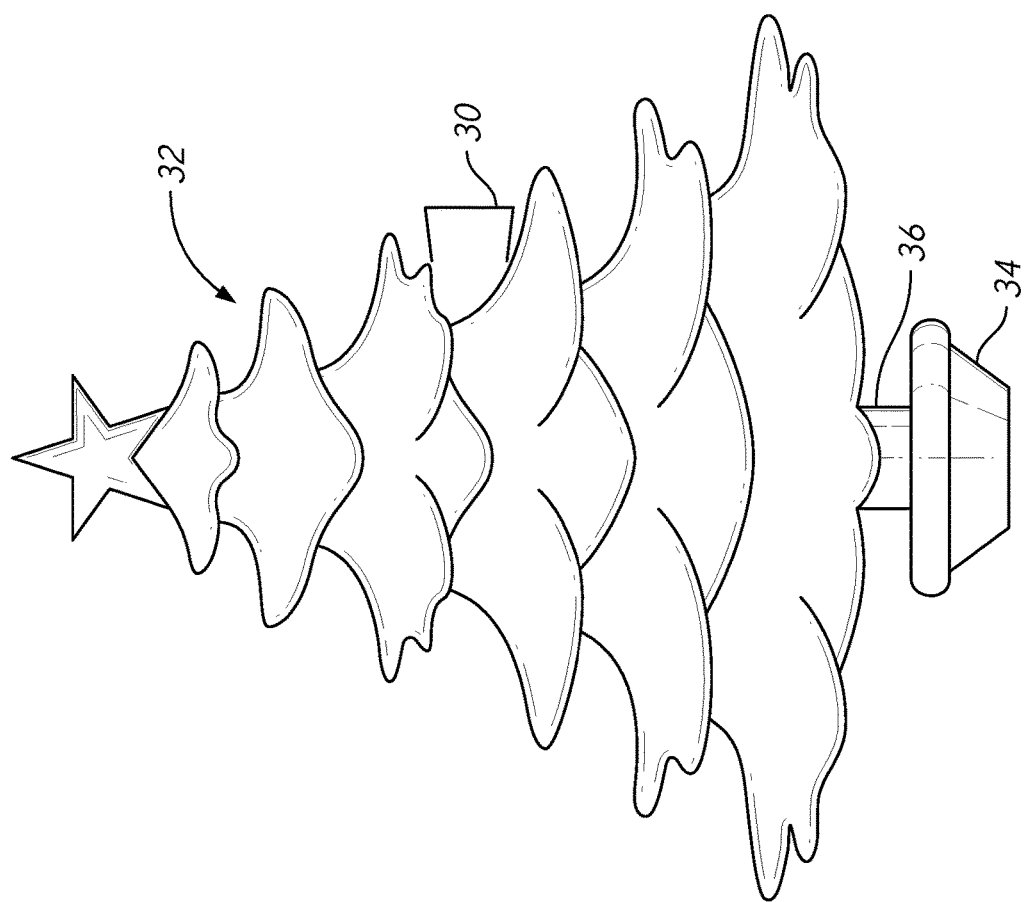
FIG. 2 is a perspective view, showing an exemplary Christmas tree on which, the present invention may be used.
Figure 3:
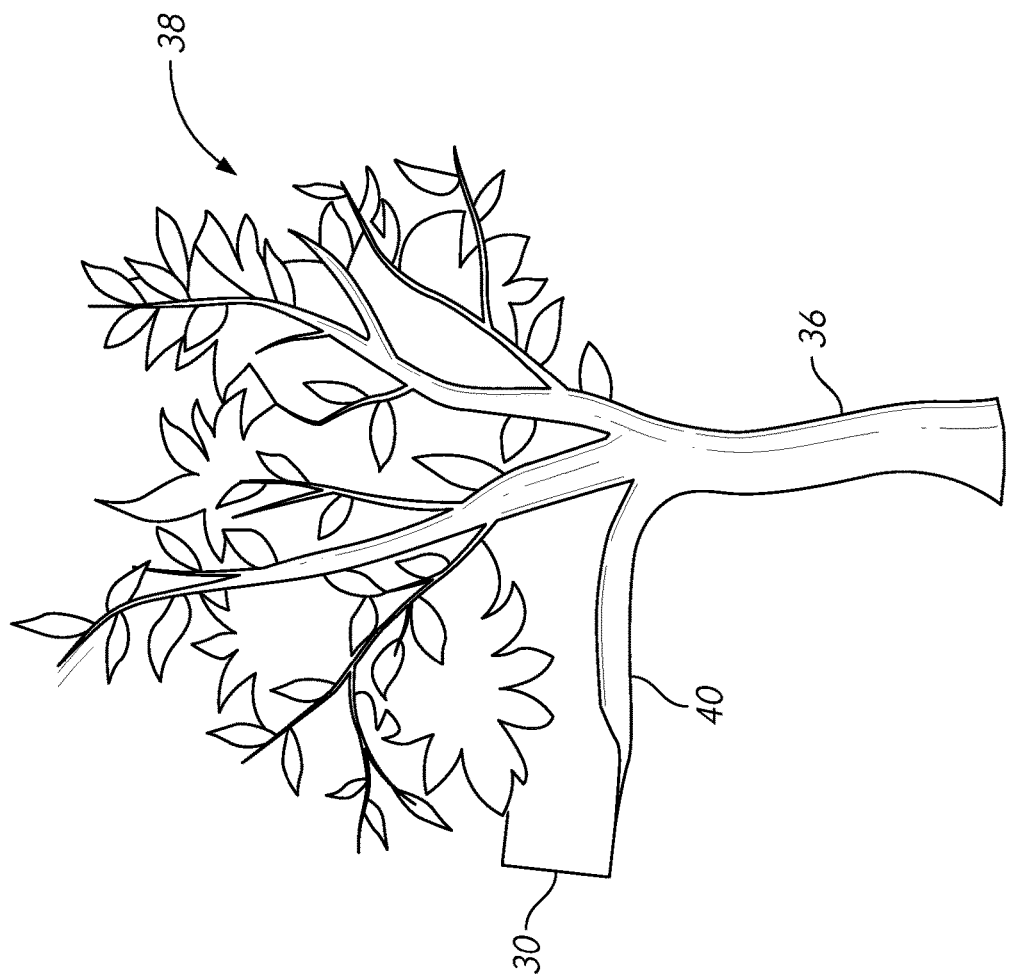
FIG. 3 is a perspective view, showing another exemplary tree on which, the present invention may be used.
Figure 4:
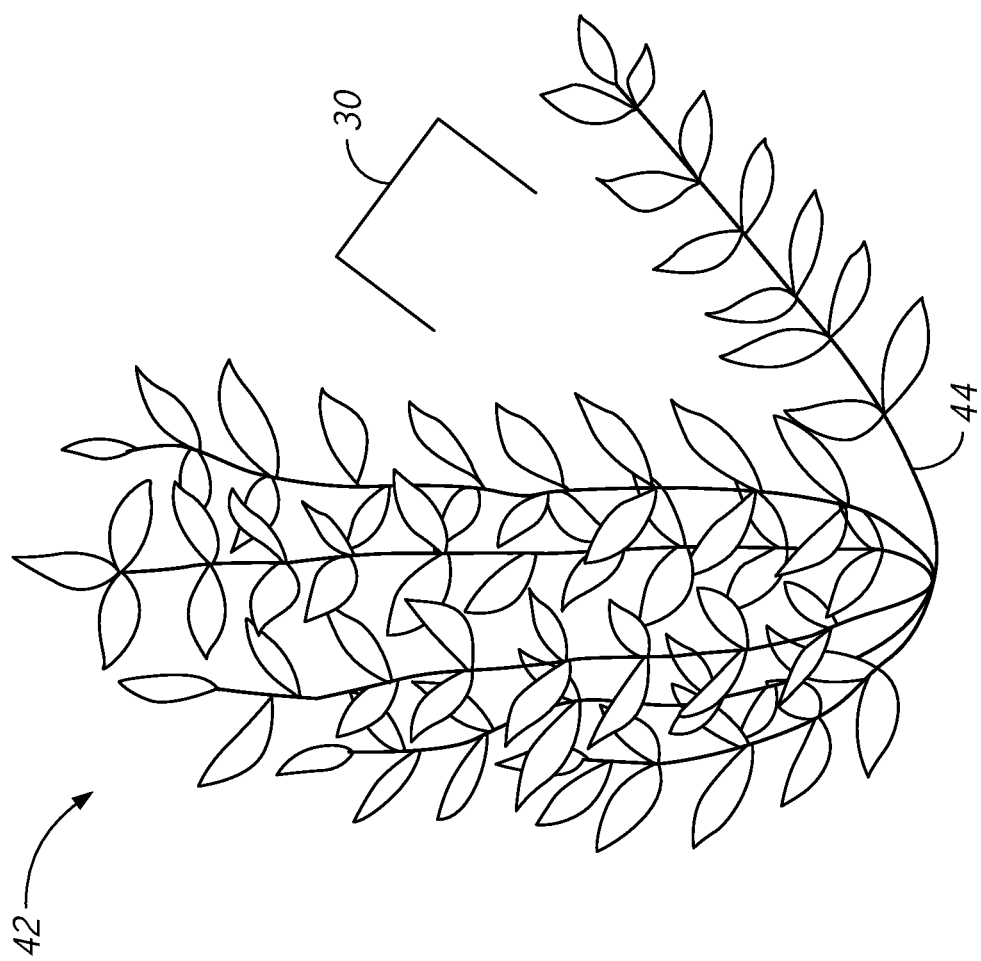
FIG. 4 is a perspective view, showing an exemplary plant on which, the present invention may be used.

REFERENCE NUMERALS IN THE DRAWINGS 10 present device
12 first member
14 second member
16 strip
20 first hook
22 second hook
24 receptacle
26 tongue
28 fastener
30 bare spot
32 Christmas tree
34 stand
36 trunk
38 tree
40 limb
42 plant
44 stem
46 tree stake
48 wrap
50 threading
52 teeth
54 aperture

DETAILED DESCRIPTION

Although reference is made to particular features of the invention throughout this disclosure, it is to be understood that the invention includes all possible combinations of these particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Figure 5A:
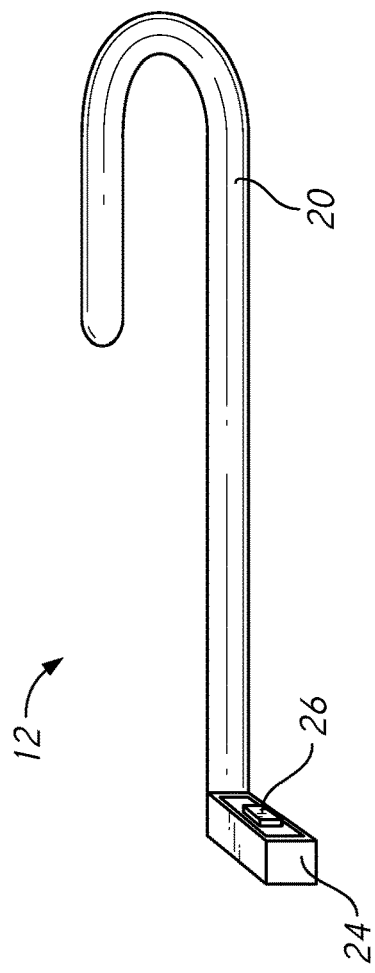
FIG. 5A is a perspective view, showing a component part of the present device.
Figure 5B:
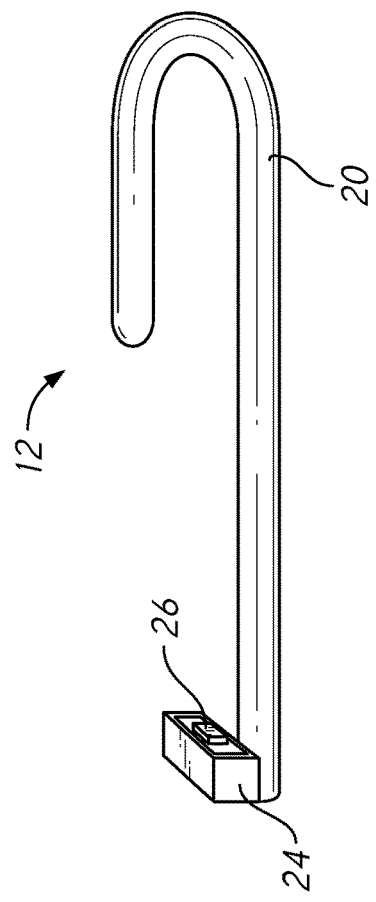
FIG. 5B is a perspective view, showing a component part of the present device.

FIGS. 5A and 5B show first member 12 of the present invention. First member 12 of device 10 (shown in FIGS. 7A and 7B) has a first hook 20, at a first end, and a receptacle 24 (first connector), at a second end. First hook 20 extends into receptacle 24, at second end of first member 12. Receptacle 24 opens away from or to the side of opening of first hook 20 (i.e. hook extends away from receptacle 24 opposite or to the side of the central axis of the aperture of receptacle 24). The aperture of receptacle 24 opposite or away from first hook 20 prevents obstruction by first hook 20 when strip 16 (not shown) is pulled through aperture of receptacle 24. Tongue 26 attaches to receptacle 24 such that tongue 26 primarily blocks the exit of receptacle 24 in order to engage with positive-locking teeth 52 (not shown) and secure second member 14 to first member 12 (shown in FIGS. 7A and 7B). Aperture of receptacle 24 accepts threading 50 and contacts ratcheting tongue 26. Ratcheting tongue 26 engages with teeth 52 (shown in FIGS. 7A and 7B) to hold second member 14 to first member 12 at a desired length so that the two members do not come apart, as shown and described in further detail below. The reader will appreciate that only first member 12 of device 10 is shown in FIGS. 5A and 5B. In FIG. 5A first member 12 is shown with receptacle 24 opposite first hook 20. FIG. 5B shows an alternate embodiment wherein receptacle 24 opens to the side of first hook 20. Note that FIGS. 5A and 5B show the first end of the hook extending rearward away from the viewer (as if the first member 12 is lying flat on a surface). The reader will appreciate that any configuration of receptacle 24 is possible except placing opening of receptacle 24 on the same side as first hook 20. Configuring device in this manner could cause strip 16 to be blocked by curvature of first hook 20 while in use.

FIGS. 6A and 6B show second member 14 of device 10 in two different configurations. Second member 14 comprises a second hook 22 on one end and a strip 16 (second connector) having threading 50 with teeth 52 on the other end. Strip 16 has a length, making second member 14 of the present invention longer than first member 12 (shown in FIGS. 5A and 5B). The length of strip 16 depends on the plant or tree it is designed to be used with. For example, where device 10 is used with a typical Christmas tree, strip 16 may be approximately 3 inches long. Strip 16 includes threading 50 which is made up of a series of teeth 52. Teeth 52 are preferably on the side of strip 16 opposite the curvature of hook 22, since teeth 52 must engage with ratcheting tongue 26 (not shown) when in use. Teeth 52 resemble multiple raised linear bumps in threading 50 with a positive-locking feature (i.e. curved on one side with a flat wall on the other). As such, teeth 52 each receive ratcheting tongue 26 and act as a stopping point along the length of threading 50 where ratcheting tongue 26 rests, allowing first member 12 to be held securely to second member 14 at a desired length. Thus, it is through threading 50 and teeth 52 that both first member 12 and second member 14 of present invention (shown in separate pieces in FIGS. 5A, 5B, 6A and 6B) form one unit using the methods shown and described. The reader will appreciate that device 10 comprises first member 12 and second member 14 that form one unit when in use. Although the connecting means are described, any known method of connecting the two members could be used.

Figure 7A:
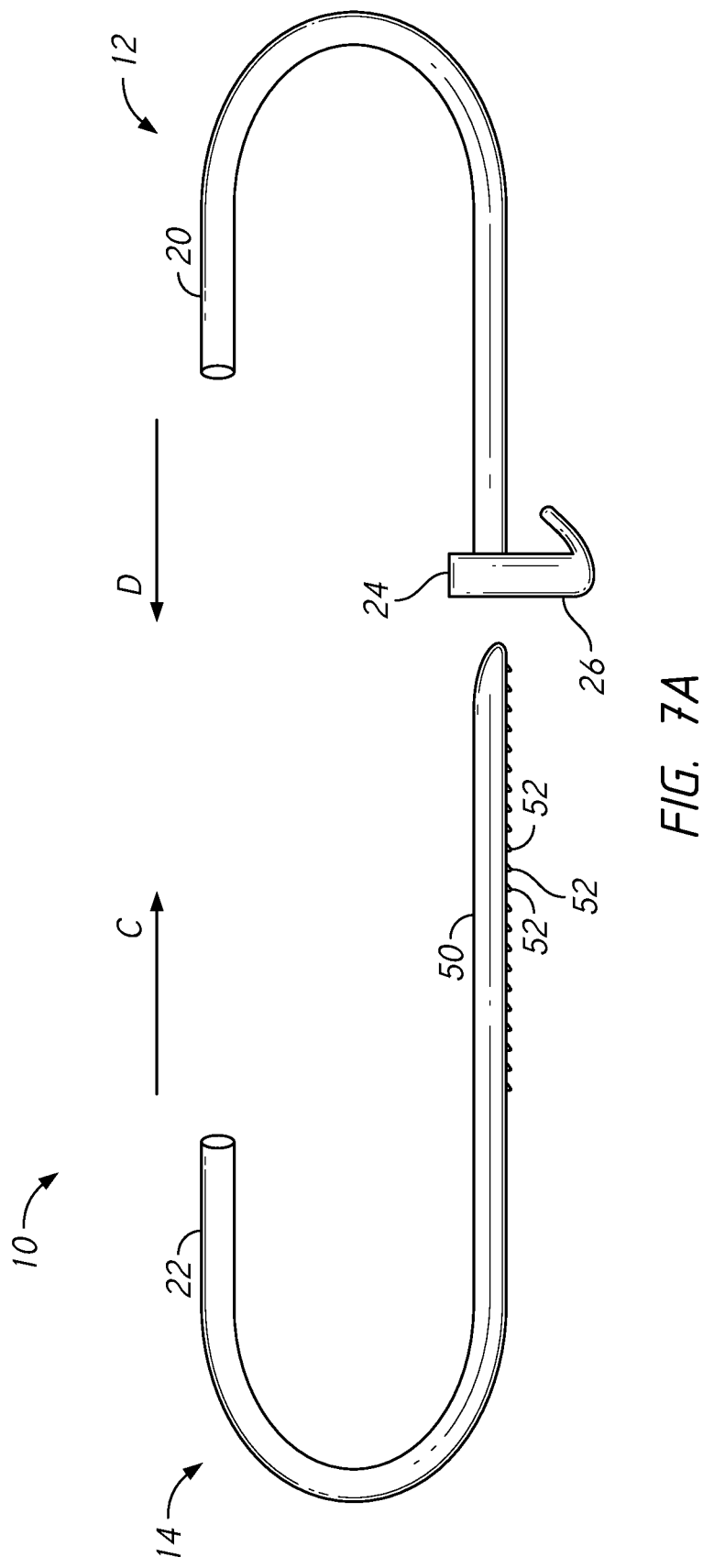
FIG. 7A is a perspective view, showing one way to attach the present device together for use.
Figure 7B:
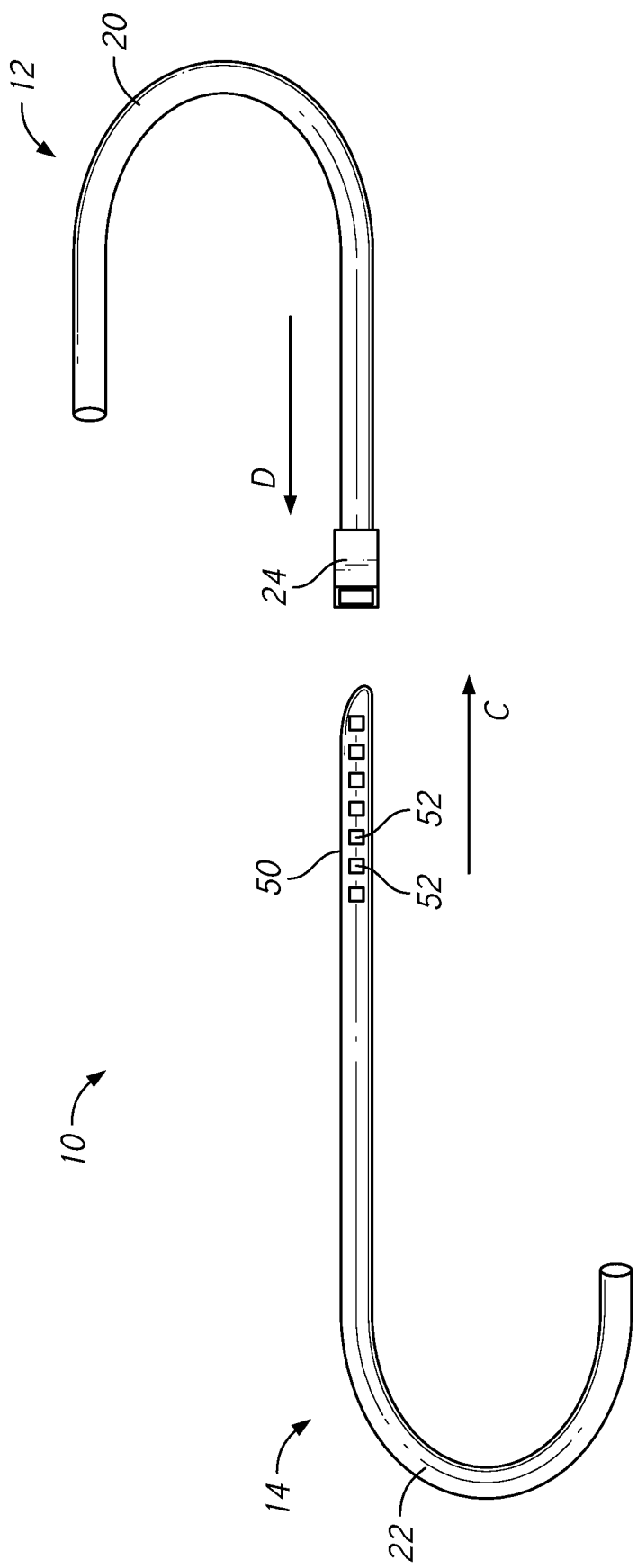
FIG. 7B is a perspective view, showing another way to attach the present device together for use.

FIGS. 7A and 7B depict the way first member 12 and second member 14 of device 10 attach together to form one unit. The reader will appreciate that FIGS. 7A and 7B merely depict the steps that can be used to attach first member 12 and second member 14 together but do not depict the device 10 in use on a tree or plant. Strip 16 is moved towards receptacle 24 in the direction of arrow "C". Receptacle 24 is moved towards strip 16 (and threading 50) in the direction of arrow "D". User applies pressure to move both components of device 20 together until the members 12, 14 align and aperture of receptacle 24 receives threading 50 at a determined length, based on the particular use of the device 10. The reader will appreciate that, when in use, as shown and described below, both forces shown through "C" and "D" are not required. For example, a user may choose to solely use the motion of arrow "C" to attach threading 50 to ratcheting tongue 26. Alternatively, a user may solely use the motion of arrow "D" to force the receptacle 24 over threading 50. Finally, a user may choose to move both first and second member 14, 16 of device 20 together in the direction shown in "C" and "D" to connect each member to the other simultaneously. The reader will note that the device 10 can be configured such that first hook 20 and second hook 22 face one another, as shown in FIG. 7A. Alternatively, first hook 20 and second hook 22 can open opposite one another, as shown in FIG. 7B. In either embodiment, there is an initial distance between first hook 20 and second hook 22 upon engagement. The user can choose to maintain that initial distance or choose to progressively narrow that distance by forcing said first and second hook closer together (ratcheting tongue 26 further into receptacle 24). The set distance between the first and second hook is adjusted by the user to provide the user's desired distance between the two limbs.

Figure 8:
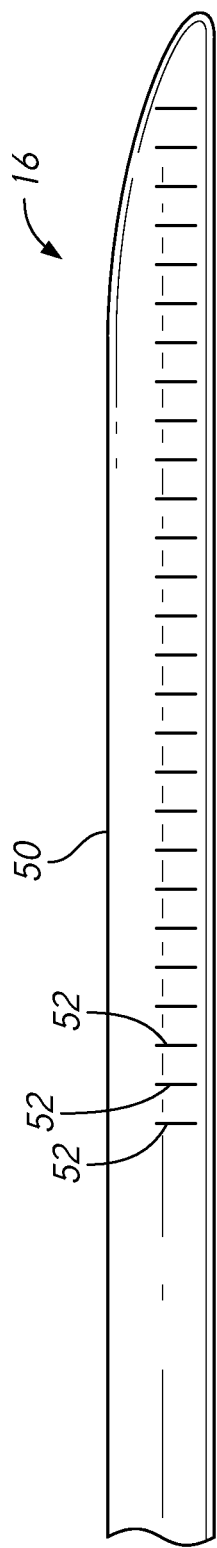
FIG. 8 is an exploded view, showing the teeth on the threading of one component of the present invention.

FIG. 8 is an exploded view of the bottom portion of second member 14 of device 10, showing strip 16. Threading 50 is made up of a series of teeth 52. As described above, teeth 52 are preferably on the side of strip 16 opposite the curvature of second hook 22 (not shown) but can be on any part of strip 16 which allows threading 50 to engage with first member 12. Teeth 52 are typically raised linear bumps with a curved side and a straight wall side, although they could also be indented canals as well (having a curved side and straight wall side). The reader will appreciate that teeth 52 may take on many shapes, so long as they are capable of engaging with ratcheting tongue 26 (not shown) when they are forced into receptacle 24 (not shown).

Figure 9:
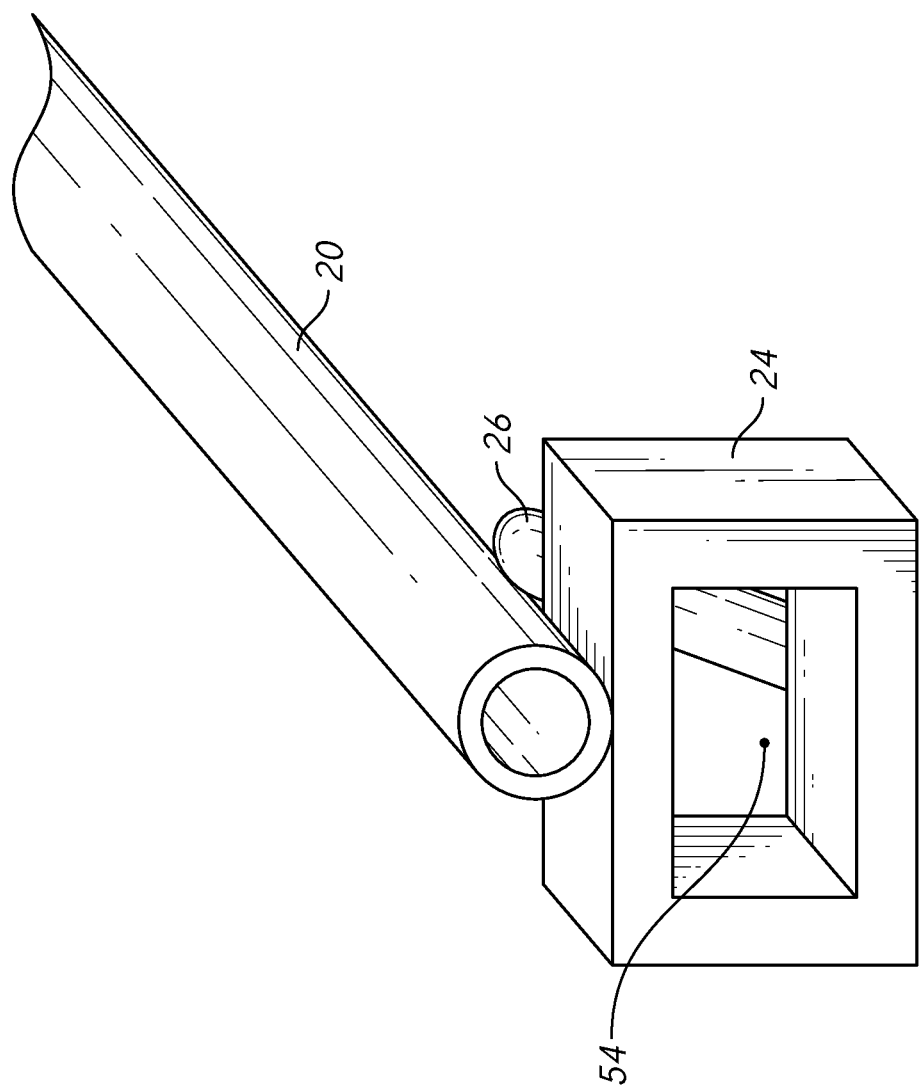
FIG. 9 is an exploded view, showing the aperture of the receptacle of the present invention.

FIG. 9 is a detailed depiction of receptacle 24. As can be seen, aperture 54 is formed by receptacle 24. Aperture 54 receives threading 50 (not shown) when device 20 is in use. Ratcheting tongue 26 (depicted larger than usual for illustration) is attached to receptacle 24 to cover a portion of aperture 54, such that tongue 26 is capable of engaging with teeth 52 (not shown) of threading 50. Receptacle 24 is attached to the second end of first hook 20 (not shown). First hook 20 is preferably aligned with receptacle 24 such that the curvature of first hook 20 extends away from (and opposite) aperture 54. Additionally, threading 50, teeth 52 and receptacle 24 can be designed to be adjustable—such that the user can adjust strip 16 in two directions (rather than one). These types of adjustable "zip ties" are known in the industry.

Figure 10:
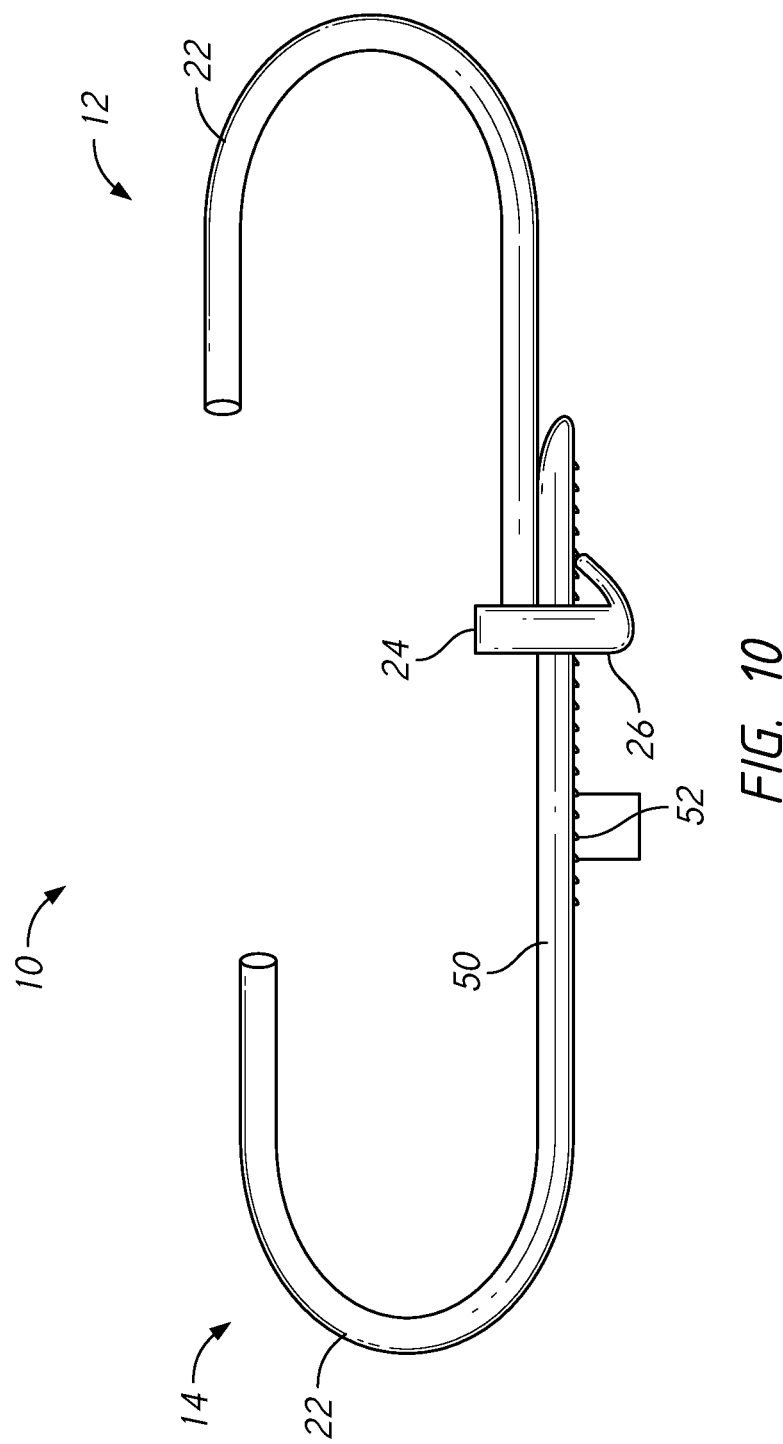
FIG. 10 is a perspective view, showing the present device once in use according to the present methods of use.

FIG. 10 shows device 10 securely held in place once first member 12 is connected to second member 14, such as when in use on a Christmas tree (not shown). Threading 50 is received in aperture 54 (not shown) of receptacle 24 and pushed through until teeth 52 of threading 50 engage with ratcheting tongue 26. Depending on the size of the bare spot in the tree (not depicted), the user will move threading 50 until ratcheting tongue 26 catches a desired tooth 52. Thus, receptacle 26 will receive more of the length of threading 50 where bare spot 30 is larger and will receive less of the length of threading 50 where bare spot 30 is smaller. Ratcheting tongue 26 then holds both components of device 20 secure at a set length in one unit. Although hooks 22 are shown in this figure facing the same direction, the reader will appreciate that, depending on the particular application of use, hooks 22 may be facing opposite directions as well. It is in this method that teeth 52 will be placed on the top side of strip 16, or the side facing the curvature of hook 22, as described above in FIG. 8.

Figure 11:
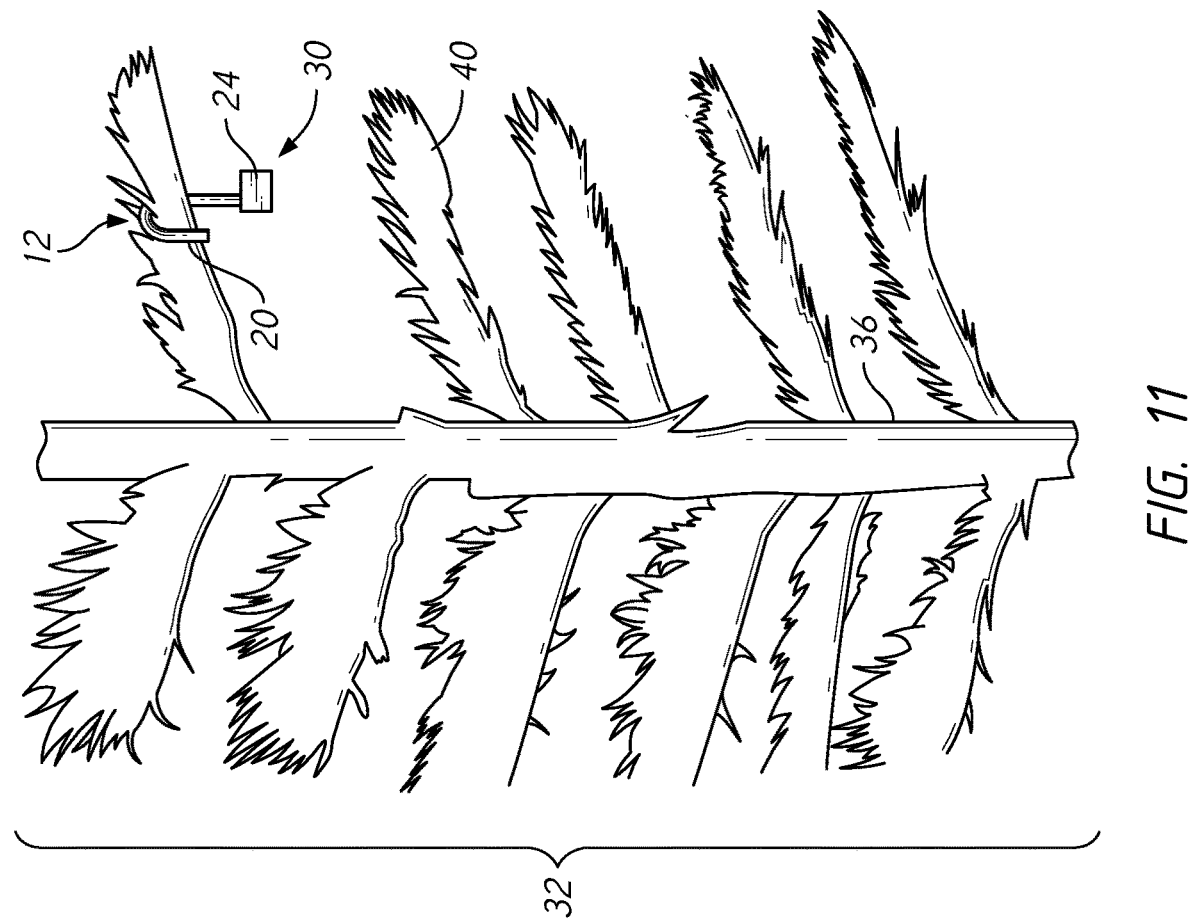
FIG. 11 is a perspective view, showing the step of attaching one piece of the present device to a tree limb.
Figure 12:
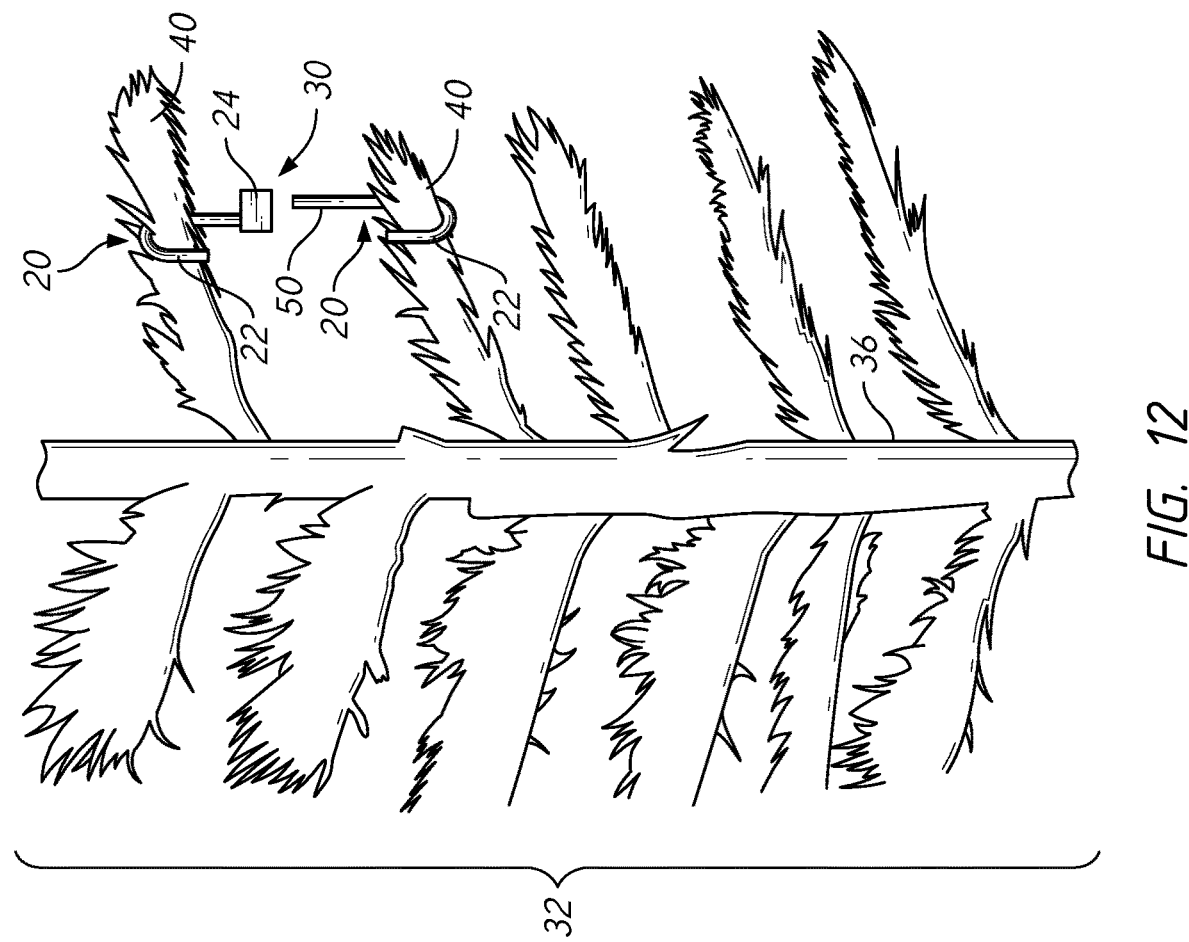
FIG. 12 is a perspective view, showing the step of attaching another piece of the present invention to a tree limb.
Figure 13:
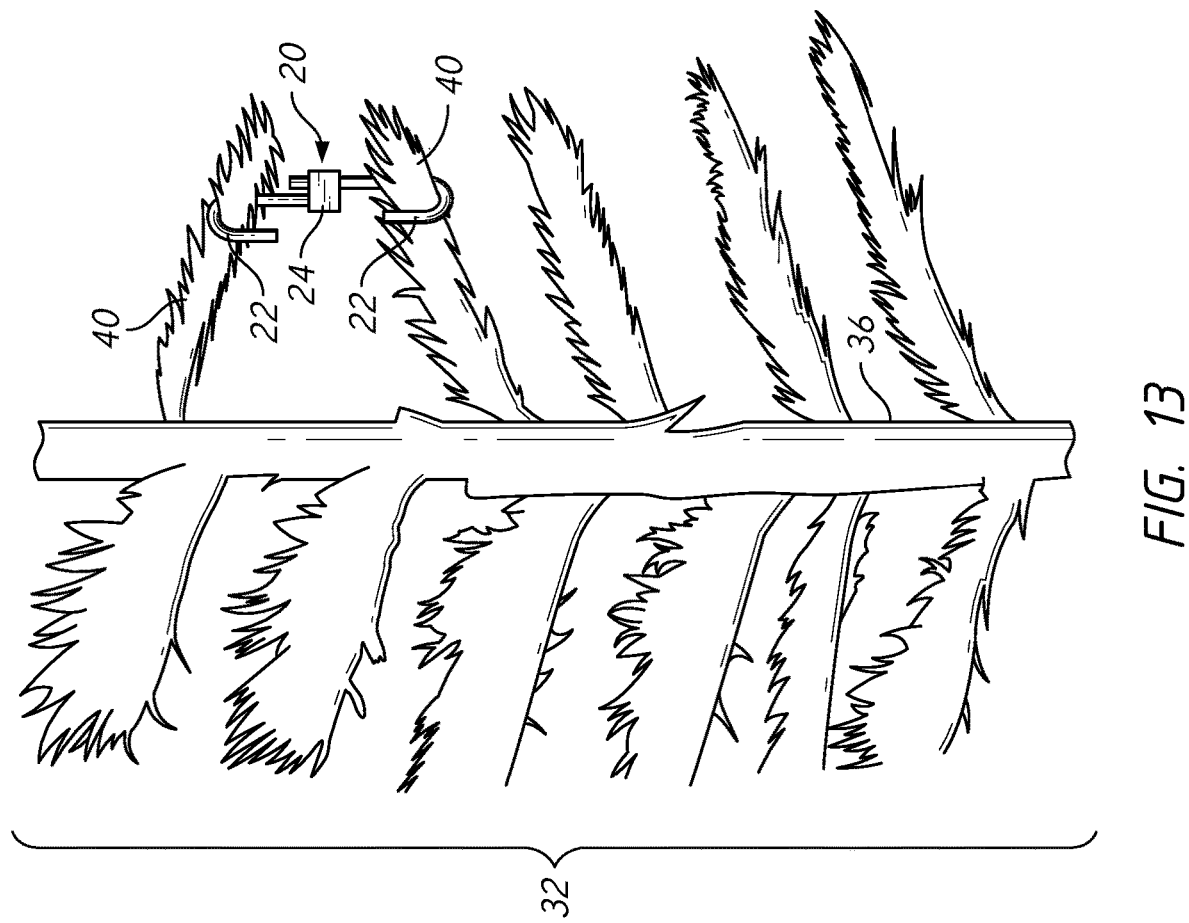
FIG. 13 is a perspective view, showing the present device while in use on a Christmas tree.

FIGS. 11-13 depict an exemplary method of the present invention. Although Christmas tree 32 is shown, the reader will appreciate that any tree, shrub, or plant with similar foliage and limb structure may benefit from the present invention. The user identifies bare spot 30 in Christmas tree 32. Then, the user will identify two limbs to pull toward one another to minimize the bare spot 30. Next the user hooks first member 12 of device 10 onto one of the identified limbs 40, as shown in FIG. 11. User must attach device 10 onto limb 40 by placing the curvature of first hook 20 directly over limb 40. Thus, in this example, first hook 20 surrounds limb 40. Though first member 12 with receptacle 24 is shown in this figure, the reader will appreciate that second member 14 with threading 50 may also be utilized in this step.

FIG. 12 depicts the step of placing second member 14 of the present invention onto limb 40. A second limb surrounding bare spot 30 is engaged. In this example, limb 40 rests below bare spot 30. The user places the curvature of second hook 22 around limb 40. At this stage, receptacle 24 and threading 50 must be facing each other as well as facing towards bare spot 30. The user either pulls strip 16 with threading 50 towards receptacle 24 aperture 54, receptacle 24 towards threading 50, or both receptacle 24 and threading 50 towards each other until they contact one another. As the user pulls the limbs 40 toward one another the force exerted by limbs 40 on device increases. User moves threading 50 into aperture 54 (not shown) of receptacle 24 until teeth 52 (not shown) engage with ratcheting tongue 26 (not shown). User continues to feed threading 50 through receptacle 24 until bare spot 30 is minimized or eliminated to the user's liking.

FIG. 13 depicts the step in which bare spot 30 is minimized or eliminated, and both first and second member 12, 14 of device 10 are one unit. As shown, limbs 40 are forced toward one another, respectively, by the force created when first and second hook 20, 22 pull limbs 40 together and are secured by threading 50 engaging with ratcheting tongue 26. The reader will appreciate that limbs 40 may be pulled together vertically, horizontally or diagonally, respective to their original location, should the user choose to fix a bare spot in a plant or tree. Ratcheting tongue 26 (not shown) allows this tightened connection to remain secure despite the force from limbs 40 created from the pull from their original connection on Christmas tree 32. The reader will appreciate that device 10 may be secured around limbs 40 further back into Christmas tree 32, closer to trunk 36, to hide device 20 more conspicuously. The result of device 20 in while is the reduction or elimination of bare spot 30, created by the relocation of limbs 40 so that they appear closer together.

The present device will typically be made of nylon throughout, though this is not required. As such, the reader will appreciate that the present invention may be made of any durable material capable of accomplishing the present methods, as shown and described. For example, hooks 22 may be made of a non-flexible yet durable material, such as metal, while the rest of the present device may be made of nylon, a flexible and durable material.

The previously described embodiment of the present invention has many advantages. The invention allows two limbs of a tree or bush to be connected to provide structural support for the plant. The invention and method of use also allow a user to connect two limbs of a tree or bush in order to lessen bare spots in the plant for ornamental purposes.

The particular embodiments described are preferred due to their advantages over the prior art but not requires in all embodiments of the invention. Importantly, the invention does not require that all the advantageous features described herein be incorporated into every embodiment of the invention.

The preceding description contains significant detail regarding the novel aspects of the present invention. It should not be construed, however, as limiting the scope of the invention but rather as providing illustrations of the preferred embodiments of the invention. As an example, teeth 52 may be on the side of threading 50 facing towards the curvature of first and second hook 20, 22 or away from first and second hook 20, 22.

Having described my invention, I claim:

1. A method of narrowing a gap between a first limb and a second limb of a plant, wherein said method allows a user to secure said at least two limbs together, said method comprising the steps of:
   providing a connector device having:
      a first member, having a first hook at a first end, extending to a first connector at a second end;
      a second member, having a second hook at a first end, extending to a second connector at a second end;
   identifying said gap between said first limb and said second limb;
   attaching said first hook of said first member to said first limb by placing said first hook around said first limb, such that said first connector extends toward said second limb;
   attaching said second hook of said second member to said second limb by placing said second hook around said second limb, such that said second connector extends toward said first connector on said first hook;
   connecting said first connector to said second connector thereby connecting said first member to said second member such that there is a set distance between said first hook and said second hook;
   narrowing said set distance by only permitting said first connector to move further into said second connector, such that said set distance between said first and second hook corresponds to a desired distance between said first limb and said second limb thereby reducing said gap between said first limb and said second limb; and
   preventing movement of said first connector out of said second connector such that said user can only narrow said set distance between said first and second hook; and
   allowing said user to move said first connector in one direction into said second connector by only contacting said first hook and said second hook, such that no contact between the user and said first connector and said second connector is required.

2. The method as recited in claim 1, wherein said first connector in said step of providing a connector device, further comprises a receptacle, wherein said receptacle has an aperture, having a central axis, and a tongue and wherein said central axis of said aperture is unobstructed by said first hook.

3. The method as recited in claim 2, wherein said second connector in said step of providing a connector device, further comprises a strip having a length of threading with a series of teeth.

4. The method as recited in claim 1, further comprising the step of adjusting said first hook to face said second hook such that said first hook and said second hook are facing the same direction when connected.

5. The method as recited in claim 1, further comprising the step of adjusting said first hook and said second hook to face in opposite directions when connected.

* * * * *